(12) United States Patent
Adelman (10) Patent No.: US 12,075,763 B1
(45) Date of Patent: Sep. 3, 2024

(54) MULTI-DIRECTIONAL SPREADER BAR WITH IMPROVED RUDDER BIRD ASSEMBLY

(71) Applicant: Richard J. Adelman, Newtown, PA (US)

(72) Inventor: Richard J. Adelman, Newtown, PA (US)

( * ) Notice: Subject to any disclaimer, the term of this patent is extended or adjusted under 35 U.S.C. 154(b) by 13 days.

(21) Appl. No.: 17/803,312

(22) Filed: May 4, 2022

Related U.S. Application Data (60) Provisional application No. 63/258,464, filed on May 4, 2021.

(51) Int. Cl.
*A01K 91/08* (2006.01)
*A01K 91/053* (2006.01)

(52) U.S. Cl.
CPC ............ *A01K 91/08* (2013.01); *A01K 91/053* (2013.01)

(58) Field of Classification Search
CPC .................................................... A01K 91/053
USPC .... 43/42.74, 42, 42.22, 42.23, 43.13, 43.12, 43/44.9, 44.91, 44.87; 114/39.15, 127, 114/128, 132, 138, 140, 149, 162; 441/79
See application file for complete search history.

(56) References Cited

U.S. PATENT DOCUMENTS

| | | | | |
|---|---|---|---|---|
| 1,870,559 A | * | 8/1932 | Drake ..................... | A01K 85/16 43/42.22 |
| 2,234,588 A | * | 3/1941 | Cope ..................... | A01K 91/053 24/305 |
| 2,543,293 A | * | 2/1951 | Leitch ..................... | A01K 83/00 43/43.15 |
| 2,551,998 A | * | 5/1951 | De Groot ............... | B63C 11/50 43/43.15 |
| 2,766,548 A | * | 10/1956 | Willardsen ............. | A01K 93/00 43/43.1 |
| 2,814,901 A | * | 12/1957 | Suiter ..................... | A01K 91/08 43/42.74 |
| 3,156,065 A | * | 11/1964 | Klammer ............... | A01K 97/00 D22/137 |
| 3,858,344 A | * | 1/1975 | Watts ..................... | A01K 85/12 43/42.22 |
| 4,561,206 A | * | 12/1985 | Lowrance .............. | A01K 91/00 43/43.11 |
| 5,406,737 A | * | 4/1995 | Scott ..................... | A01K 91/08 43/4.5 |

(Continued)

*Primary Examiner* — Darren W Ark
*Assistant Examiner* — Zoe Tam Tran
(74) *Attorney, Agent, or Firm* — Armand M. Vozzo, Jr.

(57) ABSTRACT

A multi-directional spreader bar assembly includes a specially formed rudder bird assembly attached to the center of a spreader bar member for trolling a plurality of lures from a fishing boat in a spread pattern. The rudder bird assembly includes a bird-like longitudinal body having an airfoil shape with fins on either side and a pair of diagonal crossing grooves centrally formed on the bottom of the body with a hole made therethrough that is off-centered from the longitudinal axis of the body and spaced apart from the crossing grooves. A rudder plate welded to a threaded stem is adapted to engage a selected one of the bottom grooves while the threaded stem extends through the off-centered hole and held in place under coaxial spring compression so that the rudder plate and stem may be released and reset into the alternate groove to switch the trolling direction of the assembly.

8 Claims, 7 Drawing Sheets

(56) References Cited

U.S. PATENT DOCUMENTS

| | | | | |
|---|---|---|---|---|
| 5,636,467 | A | * | 6/1997 | Adams .................. A01K 91/08 43/42.22 |
| 5,979,104 | A | * | 11/1999 | Walker .................. A01K 91/08 43/43.12 |
| 10,368,533 | B1 | * | 8/2019 | Greenberg ............. A01K 91/08 |
| 2002/0000060 | A1 | * | 1/2002 | Bennis .................. A01K 93/00 43/43.11 |
| 2011/0192071 | A1 | * | 8/2011 | Adelman ............... A01K 91/08 43/43.1 |
| 2016/0165868 | A1 | * | 6/2016 | LeHew .................. A01K 85/00 43/42.74 |
| 2016/0360739 | A1 | * | 12/2016 | Adelman ............. A01K 91/053 |
| 2021/0368760 | A1 | * | 12/2021 | Greenberg ............. A01K 91/08 |
| 2022/0183263 | A1 | * | 6/2022 | Breunig ............... A01K 91/053 |

\* cited by examiner

MULTI-DIRECTIONAL SPREADER BAR WITH IMPROVED RUDDER BIRD ASSEMBLY

CROSS-REFERENCE TO RELATED APPLICATION

This application claims the benefit of U.S. Provisional Application Ser. No. 63/258,464 filed May 4, 2021 for a Multi-Directional Spreader Bar with Improved Rudder Bird Assembly.

BACKGROUND OF THE INVENTION

The present invention relates generally to trolling lures that are used in connection with fishing vessels to attract fish to the surface of the water to facilitate a catch, and more particularly to a multi-directional spreader bar assembly used in trolling for fish from a boat having an improved rudder bird member constructed and assembled at the front of the spreader bar assembly for greater support and stability thereof in trolling operations from either side of the boat.

Sport fishing in freshwater. and saltwater is extremely popular around the world and provides enjoyment and competition to millions of enthusiasts. Essential to sport fishing, artificial lures intended to simulate live bait in their appearance and movement have long been used and are found in a variety of styles, designs and arrangements suitable for casting and trolling. Trolling lures used commonly in offshore fishing are towed on extended lines from a moving boat to draw game fish to a trailing hook using the look and action of the lures in the water as well as the water disturbance they make to attract the game fish and bring them close to the water surface for the catch. A wide variety of these trolling lures can be found rigged both in-line on so-called "daisy chains" and in umbrella-like "spreader" rigs designed to simulate a school of moving baitfish when trolled using an array of artificial lures in the form of strips called teasers bearing fish images that are particularly effective in attracting fresh water stripers and big game fish of all sorts.

So-called spreader bars are used to deploy a plurality of fishing lures while trolling. When trolling, the plurality of lures can be spread out in a pattern and extended along a spreader bar behind the trolling vessel to present a greater attraction to the game fish. Lures being trolled behind a boat will basically track a straight path behind the point they are pulled from whether from rod tip or an outrigger release. This limits the total width of water that may be covered by the fisherman's lures, which in turn limits the number of fish that see and therefore may strike the lures. Lures that run very wide from the boat are said be running in "clean water" that is undisturbed by the boat's engine turbulence/bubble trail and wake. Trolling in such undisturbed "clean water" removed from the trailing wake of the fishing boat provides better visibility of the lures as well as a more natural setting to the game fish being targeted for the catch as they do most their feeding in natural clean water.

To better reach the "clean water" while trolling, a type of directional spreader bar was developed wherein a fixed angled keel is provided on a small central body formed to appear like fish bait and tethered ahead of the spreader bar that would allow the spreader bar and its lures to be guided laterally outwardly from the direction of travel of the fishing boat while trolling. Such a directional spreader bar is presented in U.S. Patent Application Publication 2018/0360013 of Breunig. Another directional spreader bar was later developed wherein the small central body tethered to the spreader bar was formed to allow the keel to be moved about 180° in its angular position on the central body so that the spreader bar could be guided away from the fishing boat in alternate directions on either side of the boat. An example of this type of bidirectional spreader bar is presented in U.S. Pat. No. 10,368,533. While these and other prior art directionally guided spreader bars have generally served their intended function, they have not been entirely satisfactory and have had limitations in trolling from larger and faster fishing boats and vessels that create greater trailing turbulence from their engines and result in even wider wakes on either side of the fishing boat. The greater reach required of these directional spreader bars and the greater strain imposed upon their respective component parts present problems with the structural integrity of their components and in their assemblies under the pressures of high-speed trolling. While some developments have been made in strengthening the components of these directional spreader bars, there is still a need for further improvements in their design, manufacture and assembly to ensure structural integrity and performance stability while in water deployments and trolling at increasingly higher speeds.

SUMMARY OF THE INVENTION

Accordingly, it is a general purpose and object of the present invention to provide an improved multi-directional spreader bar assembly of the type deployed for trolling use in sport fishing.

A more particular object of the present invention is to provide a multi-directional spreader bar assembled having an improved rudder bird means to guide and maintain the trolling pattern of the spreader bar deployment from a fishing boat in the "clean water" outside of the wake of the boat regardless of the speed and size of the boat.

Another object of the present invention is to provide an improved rudder bird assembly for deployment with a directional spreader bar that is constructed and assembled having increased structural integrity greater than those heretofore available in the prior art.

Still another object of the present invention is to provide an improved multi-directional spreader bar assembled having a rudder bird means foremost in its deployment that is rugged and durable in construction and stable in its performance despite deployment at high trolling speeds through fishing waters.

A still further object of the present invention is to provide an improved multi-directional spreader bar assembly used in trolling for game fish that is relatively inexpensive to manufacture and assemble and easy to deploy.

Briefly, these and other objects of the present invention are accomplished by a multi-directional spreader bar assembly including a specially formed rudder bird assembly attached to the middle of a spreader bar member for trolling a plurality of lures from a fishing boat in a spread pattern guided and directed outside of the wake of the boat on either side thereof while the boat moves through the water. The rudder bird assembly comprises a bird-like longitudinal body having an airfoil shape with fins projecting on either side and a pair of diagonal crossing grooves centrally formed on the bottom of the body with a hole made through the body from top to bottom that is off-centered from the longitudinal axis of the body and spaced apart from the crossing grooves. A rigid rudder plate in welded attachment to a rudder stem in the form of a threaded stud is adapted to slide into and engage a selected one of the bottom grooves while the threaded stud extends through the off-centered hole and is held firmly in place under coaxial spring compression with a domed cap nut securing the threaded end of the rudder stem. The rudder plate and stem may be released and reset into the alternate groove to switch the outbound trolling direction of the assembly.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DETAILED DESCRIPTION OF THE INVENTION

The following is a detailed description of a preferred embodiment of the present invention and the best presently contemplated mode of its production and practice. This description is further made for the purpose of illustrating the general principles of the invention but should not be taken in a limiting sense, the scope of the invention being best determined by reference to appended claims.

Referring to the drawings, the following is a list of structural components of the present multi-directional spreader bar assembly, generally designated 10, and those associated structural elements shown employed in connection with the present invention:

10 multi-directional spreader bar assembly;
12 spreader bar;
14 fishing line;
16 spreader lines;
18 lures;
20 rudder bird assembly;
22 rudder bird body;
22a through hole;
22b diagonal grooves;
23 lateral fins;
24 rudder plate;
25 weld joints;
26 rudder stem;
28 compression spring; and
30 domed cap nut.

Figure 1:
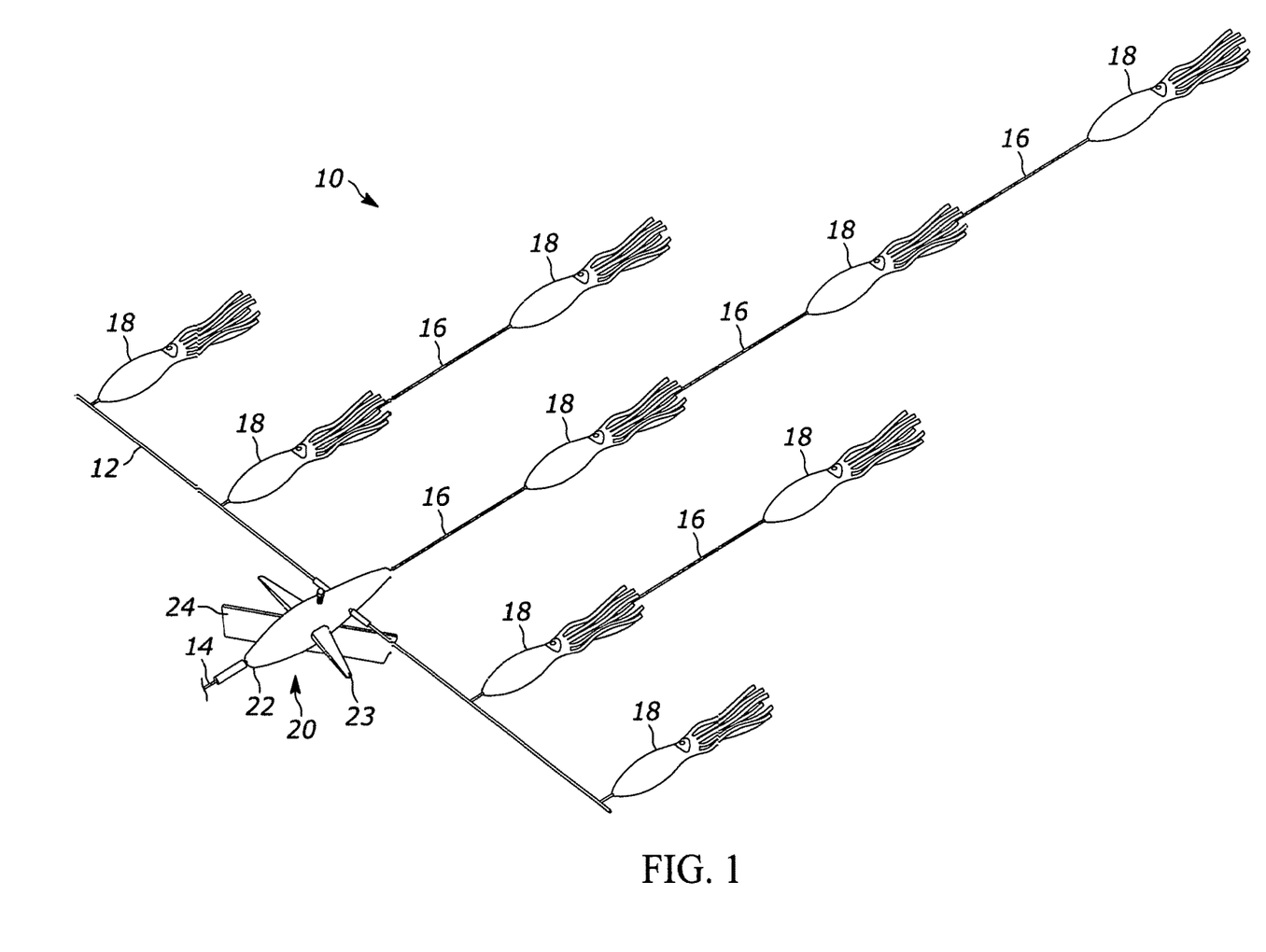
FIG. 1 is a perspective view from above of the multi-directional spreader bar assembly made in accordance with the present invention and shown operatively deployed for trolling use.
Figure 2:
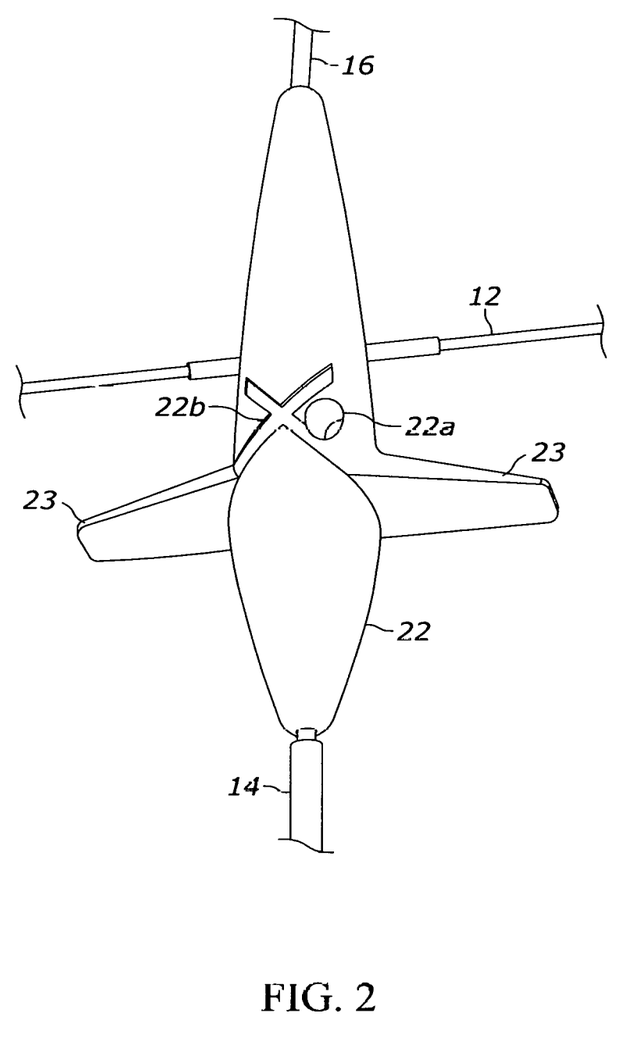
FIG. 2 is an enlarged perspective view of the underside of the rudder bird of the present invention shown in its deployed position leading the multi-directional spreader bar assembly of FIG. 1 and with its associated rudder removed to better show the bottom side of bird body.
Figure 3:
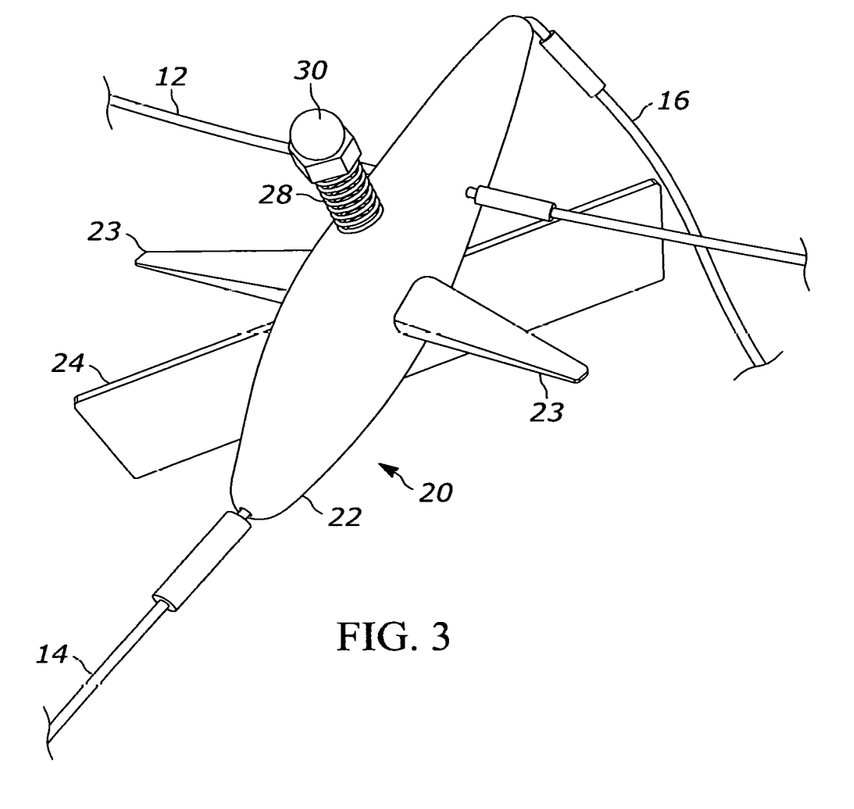
FIG. 3 is a perspective view of the topside of the rudder bird assembly shown in deployed position within the present multi-directional spreader bar assembly of FIG. 1 and with its associated rudder assembled in place at one angular position selected for operational use.
Figure 4:
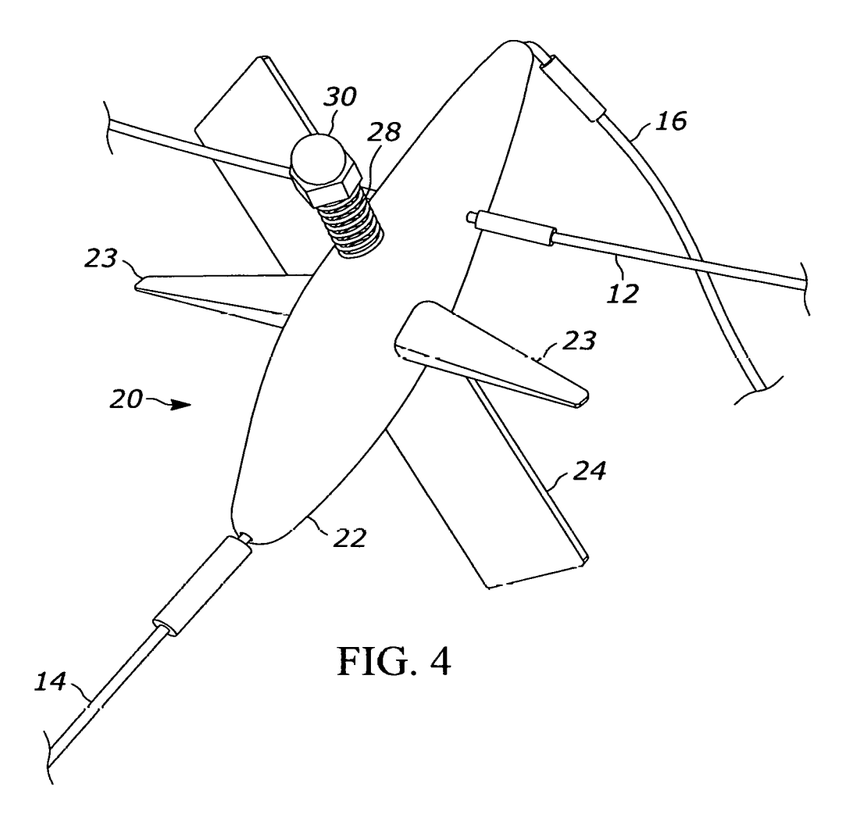
FIG. 4 is a perspective view of the topside of the rudder bird assembly shown in deployed position within the present multi-directional spreader bar assembly of FIG. 1 and with its associated rudder assembled in place at another angular position selected for operational use.

Referring now to FIG. 1, the multi-directional spreader bar assembly 10 of the present invention comprises a spreader bar 12 used to deploy a plurality of fishing lures 18 spread out laterally along the bar and then extended linearly along flexible spreader lines 16 in a mobile pattern designed to attract game fish while being trolled in motion through the water. The spreader bar 12 is preferably made and fabricated from a length of high quality Titanium bar stock, having finished spans of 2 or 3 feet, and is provided with swivel attachments along the span to rotatably connect the lures 18 to the spreader bar.

The present multi-directional spreader bar assembly 10 further comprises a specially constructed rudder bird assembly 20 adapted to engage the spreader bar 12 laterally across the span thereof and be connected thereto near the midspan of the spreader bar forward of the extended pattern of lures 18. A fishing line 14 extending from a fishing rod or outrigger pole on the fishing boat (not shown) is secured to the front of the rudder bird assembly 20 and may extend therethrough to interconnect one or more of the lures 18 in the middle of the deployed pattern.

Referring now to FIGS. 2-7 in conjunction with FIG. 1, the rudder bird assembly 20 includes a longitudinal bird-like body 22, preferably made from an injection-molded plastic material, having an airfoil shape with lateral fins 23 projecting on either side. Small openings fore and aft on the body 22 may be provided to allow fishing line 14 to pass therethrough. On the bottom surface of the bird body 22 are formed a pair of diagonally crossing grooves 22b, best seen in FIGS. 2 and 7. The crossing grooves 22b are similar in their length, width and depth dimensions and are centrally positioned on the bottom surface of the bird body 22 with their crossing intersection being centrally located in the middle of the length and width of the bird body. Spaced apart from the central intersection of the crossing grooves 22b and positioned off-centered from the longitudinal axis of the bird body 22, a hole 22a is formed through the bird body from top to bottom. It should be noted that the off-centered hole 22a through the bird body 22 spaced apart from the central axis location of the crossing grooves 22b on the bottom of the body furnishes a unique chamber location for the controlled adjustment and secure placement of the multi-directional rudder means of the present invention.

The rudder means employed on the rudder bird assembly 20 of the present invention includes a rudder plate 24 and its associated rudder stem 26. The rudder plate 24 is a rigid rectangular member preferably made of a metallic material, such as aluminum, to provide sufficient weight, strength and durability in performance, that is further powder-coated for greater strength and protection in its marine environment. The rudder stem 26 is a threaded stud of a like metallic material similarly powder-coated that is positioned to one side of the rudder plate 24 midway along its length and attached via weld joints 25 so that the stem and the plate become an integrated member with the stem projecting from the plate and the threaded end of the stud extending from the plate in a perpendicular direction.

Figure 5:
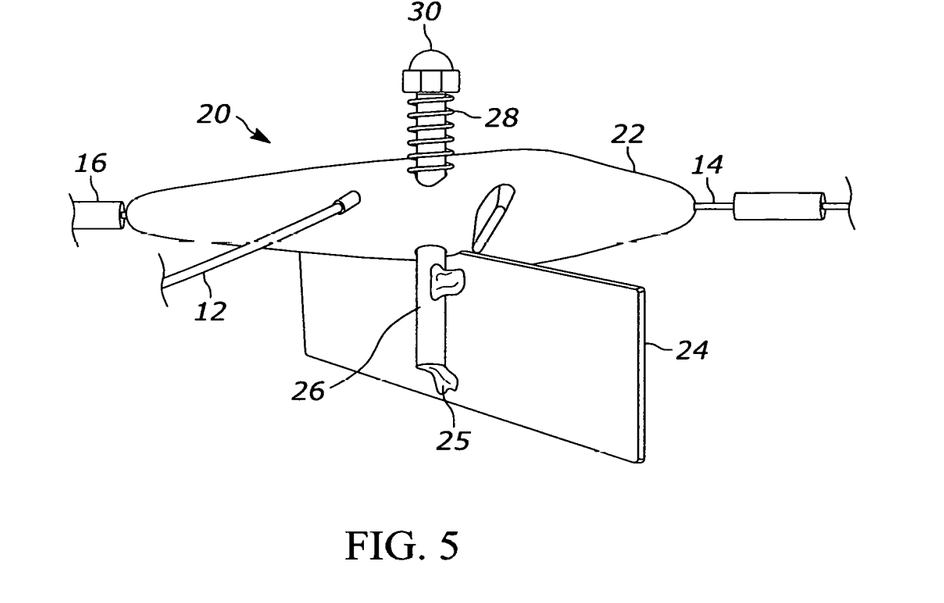
FIG. 5 is a side perspective view of the present rudder bird assembly in its deployed position with its associated rudder in place.
Figure 6:
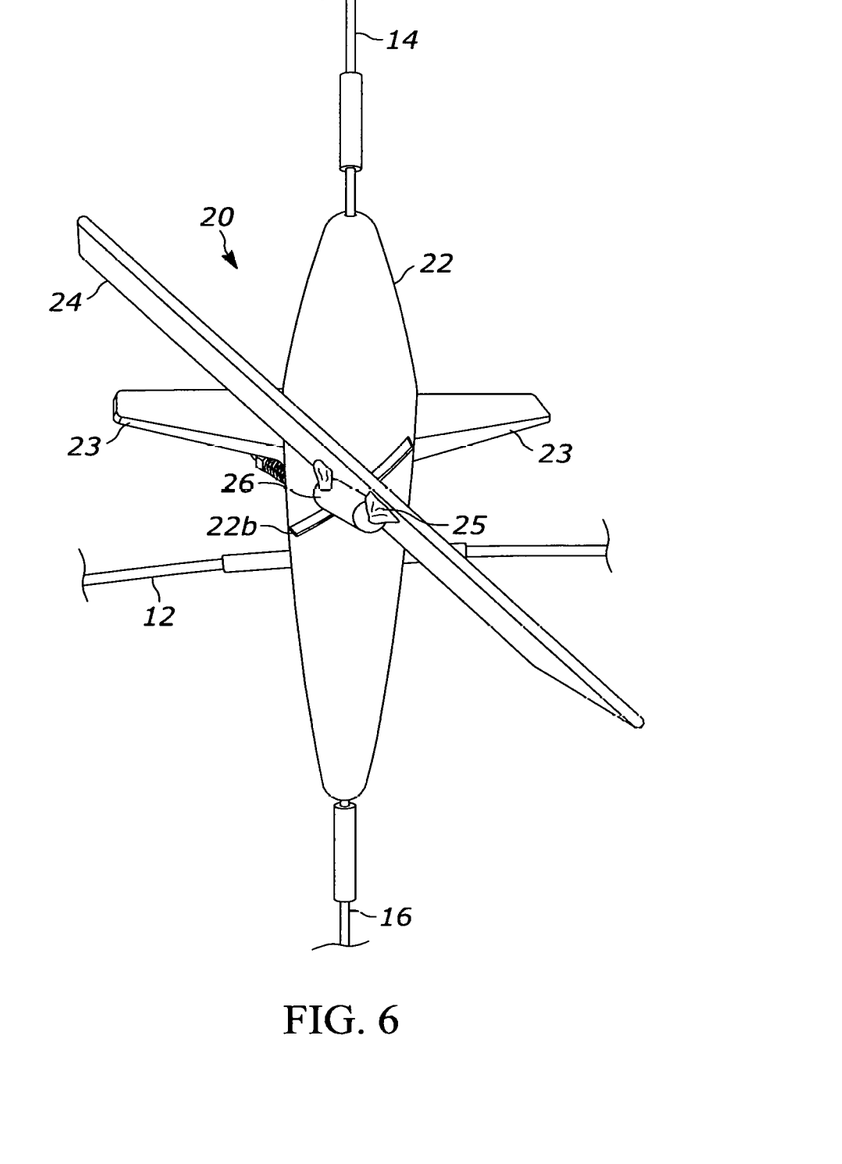
FIG. 6 is a bottom view of the rudder bird assembly of FIG. 5.
Figure 7:
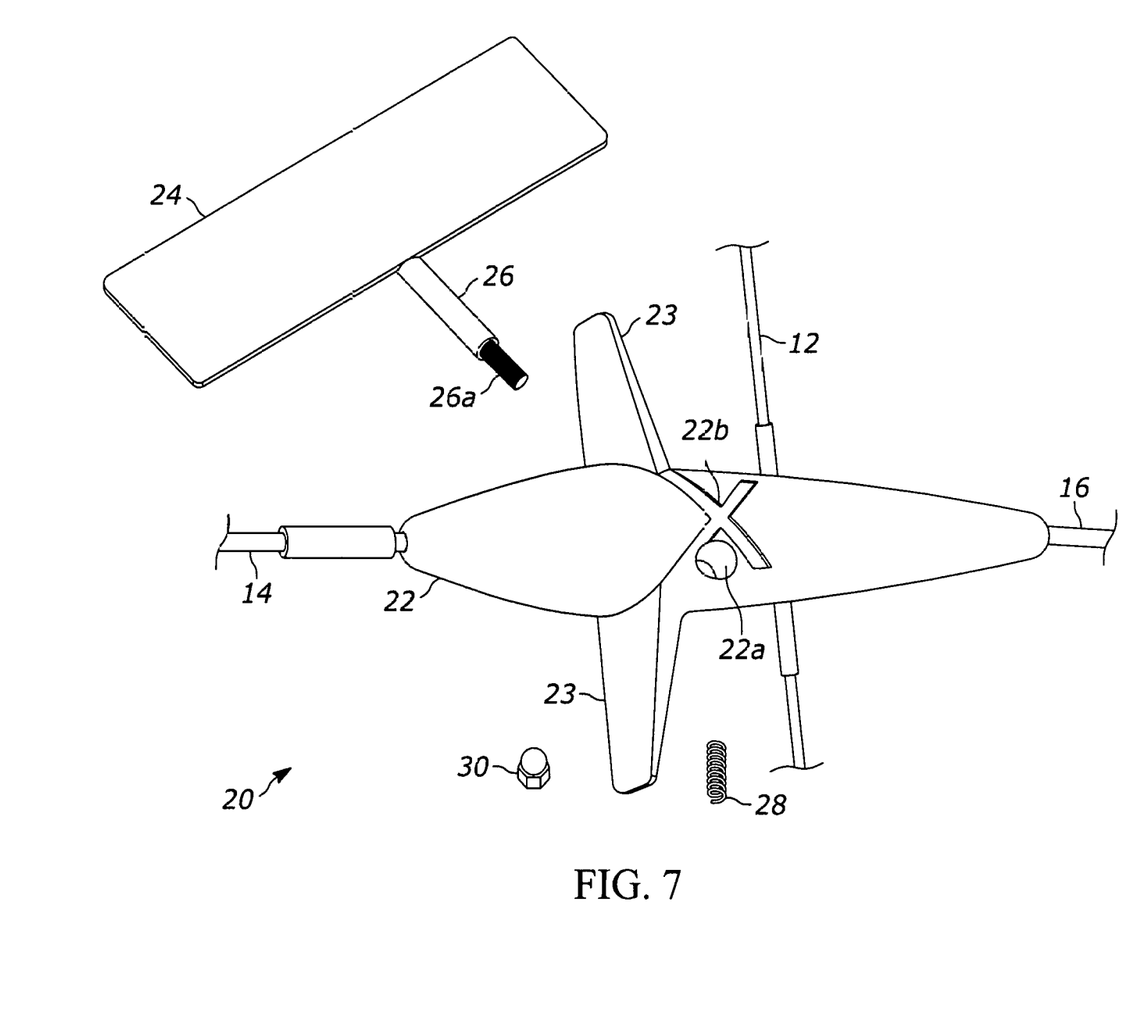
FIG. 7 is an exploded view of the component parts of the present rudder bird assembly.

Together as an integrated member, the rudder plate 24 with welded rudder stem 26 is adapted to fit into and engage a selected one of the crossing grooves 22b on the bottom of the bird body 22 while the threaded end of the rudder stem extends through the off-centered hole 22a to project from the top of the bird body. The fitted engagement between the rudder plate 24 and each of the crossing grooves 22b serves to resist any twisting or torquing of the plate until disengaged from the grooves. A compression spring member 28 preferably made of a stainless steel material and sized to fit axially over the threaded end of the rudder stem 26 is adapted to slide into abutting contact with the upper surface of the bird body 22 atop the hole 22a. A conventional domed cap or acorn nut 30 of a like stainless steel material is sized to fit upon and engage the threaded end of the rudder stem 26 and urge upon the outside end of the compression spring 28 through torquing to secure the position of the rudder stem in the hole 22a of the bird body 22 and hold the rudder plate 24 firmly in place in the selected crossing groove 22b. As best seen in FIGS. 5 and 6, this assembled state of the rudder bird assembly 20 with its off-centered attachment of rudder plate 24 through the bird body 22 provides greater balance and stability to the assembly when deployed on the water surface, further allowing the bird assembly to sit lower in the water for better tracking and resistance to flipping over. As seen comparatively in FIGS. 3 and 4, the integrated combination of the rudder plate 24 and associated rudder stem 26 may be released through loosening of nut 30 and decompressing spring 28 to allow rudder plate 24 to be reset into alternate grooves 22b to switch the outbound trolling direction of the assembly.

Therefore, it is apparent that the described invention provides an improved multi-directional spreader bar assembly for trolling use in sport fishing. More particularly, the present invention provides an improved multi-directional spreader bar assembled having a specially formed rudder bird assembly that will guide and maintain the trolling pattern of the spreader bar deployment from a fishing boat in the "clean water" outside of the wake of the boat regardless of the speed and size of the boat. In its described construction and assembly, the present rudder bird assembly provides increased structural integrity and greater stability trolling in fishing waters than those heretofore available in the prior art. The present rudder bird assembly is rugged and durable in construction and stable in its performance despite deployment at high trolling speeds. In the preferred embodiment described above, the present multi-directional spreader bar assembly works effectively in trolling operations from fishing boats of all sizes, is relatively inexpensive to manufacture and assemble and easy to deploy.

Obviously, other embodiments and modifications of the present invention will readily come to those or ordinary skill in the art having the benefit of the teachings presented in the foregoing description and drawings. Alternate embodiments of different shapes and sizes, as well as substitution of known materials or those materials that may be developed at a future time to perform the same function as the present described embodiment are therefore considered to be part of the present invention. Accordingly, it is understood that this invention is not limited to the particular embodiment described, but rather is intended to cover modifications within the spirit and scope of the present invention as expressed in the appended claims.

What is claimed is:

1. A multi-directional spreader bar device for trolling multiple fishing lures from a boat in a direction outside of the wake of the boat on either side thereof, comprising:

a spreader bar having an extended span adapted to secure the fishing lures at separate positions along the span; and a rudder bird assembly intended to be tethered to the boat and coupled to the spreader bar, the rudder bird assembly comprising a rudder bird body formed along a longitudinal axis having an airfoil shape with fins projecting on either side and further formed having a pair of diagonal crossing grooves intersecting on a bottom of the rudder bird body and an off-centered hole projecting through the rudder bird body from a top to the bottom thereof, the off-centered hole being offset from the longitudinal axis of the rudder bird body and spaced apart from the intersection of the crossing grooves; and rudder means operatively connected to the rudder bird body and secured through the off-centered hole to maintain firm fitted engagement of the crossing grooves with the rudder means for controlling the trolling direction of the fishing lures.

2. A multi-directional spreader bar device according to claim 1, wherein the rudder means comprises:

a rudder stem in the form of a threaded stud having a threaded bottom end sized to fit and extend through the off-centered hole of the rudder bird body; and a rudder plate sized to fit a selected one of the crossing grooves in the rudder bird body and welded in integral attachment to the rudder stem alongside the upper end thereof so that the threaded bottom end of the rudder stem extends in a perpendicular direction from the rudder plate.

3. A multi-directional spreader bar device according to claim 2, wherein the rudder means further comprises:

a compression spring member sized to fit axially over the threaded end of the rudder stem and engage into abutting contact with the upper surface of the rudder bird body atop the off-centered hole; and a cap nut sized to fit upon and engage the threaded end of the rudder stem and urge upon the outside end of the compression spring to secure the position of the rudder stem in the off-centered hole of the rudder bird body and hold the rudder plate firmly in place in the selected crossing groove.

4. A multi-directional spreader bar device according to claim 2, wherein:

the rudder plate is a rigid rectangular member made of a metallic material; and the rudder stem is a threaded stud of a like metallic material positioned to one side of the rudder plate midway along its length and welded so that the rudder stem and the rudder plate become an integrated member with the rudder stem projecting from the rudder plate and the threaded end of the rudder stud extending from the rudder plate in a perpendicular direction.

5. A multi-directional spreader bar device for trolling multiple fishing lures from a boat, comprising:

a spreader bar adapted to secure the fishing lures at spaced positions along the bar; and a rudder bird assembly operatively connected between the boat and the spreader bar, the rudder bird assembly comprising a rudder bird body formed along a longitudinal axis having an airfoil shape with fins projecting on either side and further formed having a pair of diagonal crossing grooves intersecting on a bottom of the rudder bird body and an off-centered hole projecting through the rudder bird body from a top to the bottom thereof, the off-centered hole being offset from the longitudinal axis of the rudder bird body and spaced apart from the intersection of the crossing grooves; and rudder means operatively connected to the rudder bird body and secured through the off-centered hole to maintain firm fitted engagement of the crossing grooves with the rudder means for controlling the trolling direction of the fishing lures.

6. A multi-directional spreader bar device according to claim 5, wherein the rudder means comprises:
   a rudder stem having a threaded bottom end sized to fit and extend through the off-centered hole of the rudder bird body;
   a rudder plate sized to fit a selected one of the crossing grooves and welded in integral attachment to the rudder stem so that the threaded bottom end of the rudder stem extends in a perpendicular direction from the rudder plate;
   a compression spring member sized to fit axially upon the rudder stem and engage into abutting contact with the upper surface of the rudder bird body; and
   a cap nut sized to fit upon and engage the threaded end of the rudder stem and urge upon the outside end of the compression spring to secure the position of the rudder stem in the off-centered hole and hold the rudder plate firmly in place in the selected crossing groove.

7. A multi-directional spreader bar device according to claim 6, wherein:
   the rudder plate is a rigid rectangular member made of a metallic material; and
   the rudder stem is a threaded stud of a like metallic material positioned to one side of the rudder plate midway along its length and welded so that the rudder stem and the rudder plate become an integrated member with the rudder stem projecting from the rudder plate and the threaded end of the stud extending from the rudder plate in a perpendicular direction.

8. A multi-directional spreader bar device for trolling multiple fishing lures from a boat, comprising:
   a spreader bar having an extended span to secure the fishing lures at spaced positions along the span; and
   a rudder bird operatively connected between the boat and the spreader bar, the rudder bird including a rudder bird body having an airfoil shape formed along a longitudinal axis with fins projecting on either side and further formed having a pair of diagonal crossing grooves intersecting on a bottom of the rudder bird body and an off-centered hole projecting through the rudder bird body from a top to the bottom thereof, the off-centered hole being offset from the longitudinal axis of the rudder bird body and spaced apart from the intersection of the crossing grooves; and
   a rudder control assembly secured in place through the off-centered hole of the rudder bird for controlling the trolling direction of the fishing lures, the rudder control assembly consisting of: a rudder stem having a threaded bottom end sized to fit and extend through the off-centered hole; a rudder plate sized to fit a selected one of the crossing grooves and welded in integral attachment to the rudder stem so that the threaded bottom end of the stem extends in a perpendicular direction from the plate; a compression spring member sized to fit axially upon the rudder stem and engage into abutting contact with the upper surface of the bird body; and a cap nut sized to fit upon and engage the threaded end of the rudder stem and urge upon the outside end of the compression spring to secure the position of the rudder stem in the off-centered hole and hold the rudder plate firmly in place in the selected crossing groove.

\* \* \* \* \*